United States Patent Office 2,800,014
Patented July 23, 1957

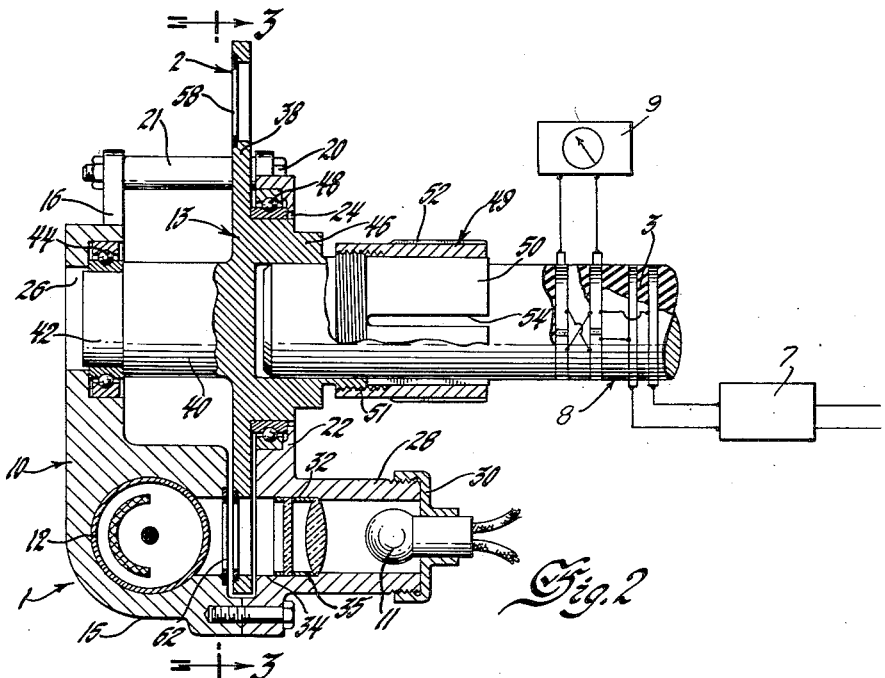
Fig. 2
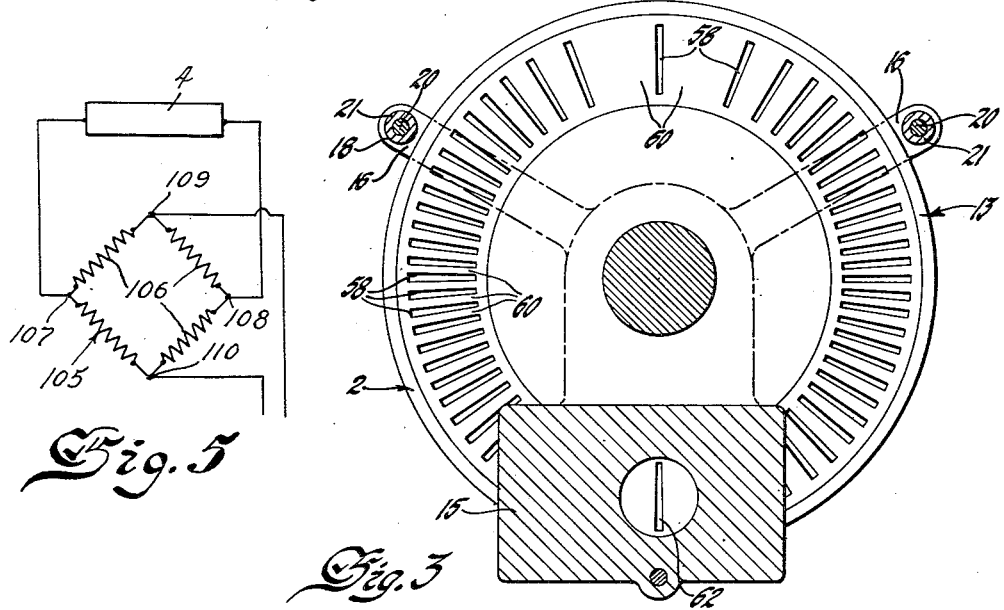
Fig. 5
Fig. 3
Inventors
Albert F. Welch &
Wesley S. Erwin, deceased
Kathrine S. Erwin, Administratrix
By
Willis, Helmig & Baillio
Attorneys

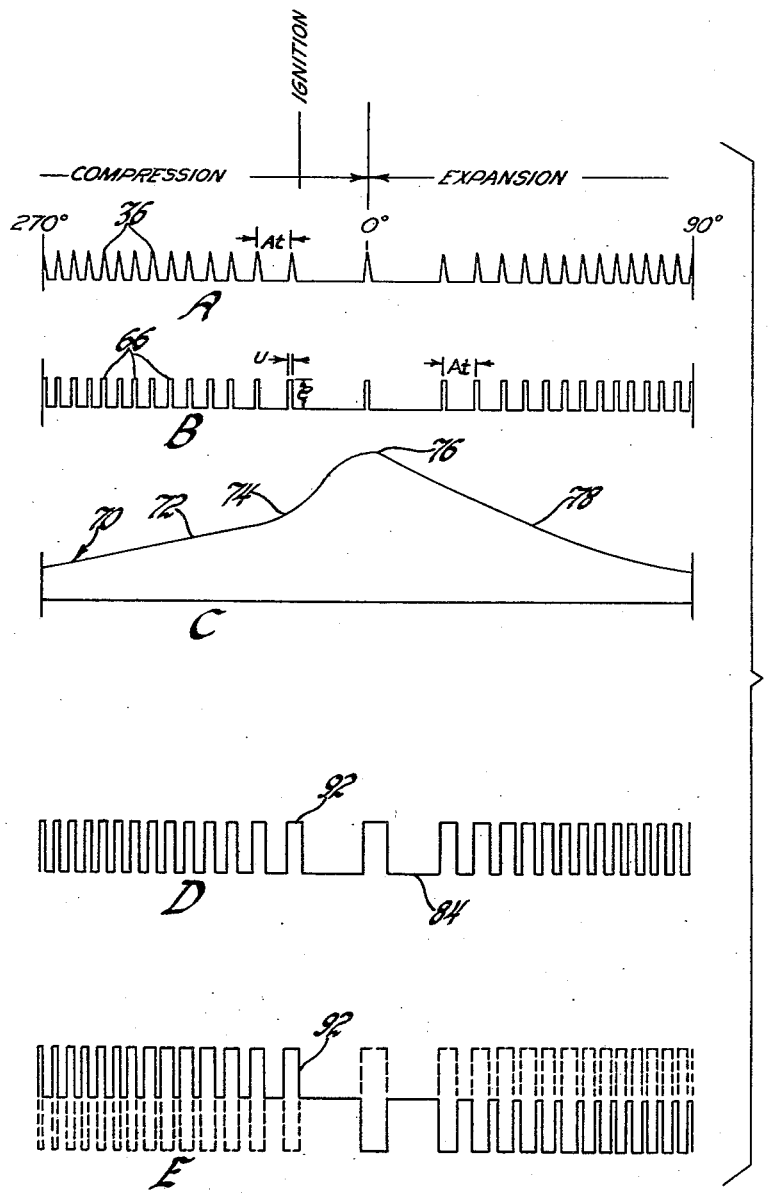

2,800,014

ENGINE POWER INDICATOR

Albert F. Welch, Detroit, Mich., and Wesley S. Erwin, deceased, late of Detroit, Mich., by Katherine S. Erwin, administratrix, Birmingham, Mich., assignors to General Motors Corporation, Detroit, Mich., a corporation of Delaware Application January 26, 1953, Serial No. 333,324

7 Claims. (Cl. 73—116)

The present invention relates generally to gauges for measuring power and more particularly to gauges for automatically giving instantaneous and continuous reading of the so called indicated horsepower developed within an internal combustion engine.

In the study of reciprocating engines wherein a gas is expanded in a cylinder it is highly desirable to have an accurate knowledge of the amount of power that is actually developed within the engine or the so called indicated horsepower. One method of obtaining a reasonably accurate indication of the indicated horsepower is to employ a dynamometer. The usual dynamometer practice is to obtain a reading of the brake horsepower while the engine is firing. The engine ignition system is then inactivated and the dynamometer is run as a motor to drive the engine. The load on the dynamometer under such circumstances will be approximately equal to the frictional loss in running the engine, and the sum of the frictional load and the brake horsepower will represent the indicated horsepower. Since the frictional drags of the bearings are materially different under loaded and unloaded conditions, there is a considerable amount of difference in the frictional drag when the engine is firing and when it is being driven by the dynamometer. Accordingly, this method provides only an approximate value.

Another method of determining the indicated horsepower is to measure the internal conditions present in the cylinder and then calculate the amount of power developed. The power developed within an engine is $$\frac{\text{Work}}{\text{Time}} \text{ or } \int \frac{\pi R^2 P \, dv}{T}$$

where P is the pressure in the cylinder, R is the radius of the piston and $dv$ an increment in the cylinder volume. In the past it has been the practice to compute this value by obtaining an oscillogram by electronic or mechanical means and then manually calculating the integral of the resultant curve by any suitable method. However, this method is subject to several severe limitations since it only permits readings at finite periods to be obtained rather than a continuous reading. Also, as a result of the necessary calculations there is a considerable time delay between the time the readings are made and the time the final values are obtained. Furthermore, there are several sources of unavoidable errors both human and mechanical which give misleading and unreliable readings.

In comparing frictional qualities of different bearings wherein the variations in the frictional drag developed by the bearings are relatively small, it is essential that all of the measurable factors be ascertained as accurately as possible. Otherwise, an error in the measurement of one of the supposedly constant factors such as the indicated horsepower might be in excess of the actual variations in the element under consideration. The present invention permits a direct reading of the indicated horsepower instead of indirect calculations thereby reducing the possibility of error and thus giving a more reliable and consistent reading. This is accomplished by providing a horsepower gauge which will electrically integrate the product of the cylinder pressure and the increments of piston displacement to thereby give a continuous and instantaneous reading of the indicated horsepower of an engine. The difference between the brake horsepower and the indicated horsepower obtained from a gauge embodying the present invention will accurately represent the frictional losses under actual firing conditions.

In the drawings:

Fig. 2 is a cross-sectional view of the switching mechanism for the present invention.

Fig. 3 is a view partly in section taken substantially along the plane represented by line 3—3 of Fig. 2.

Fig. 4 is a schematic view of a modification of the present gauge and a diagrammatic representation of the wave forms present therein.

Fig. 5 is a schematic view of a portion of the gauge.

Figure 1:
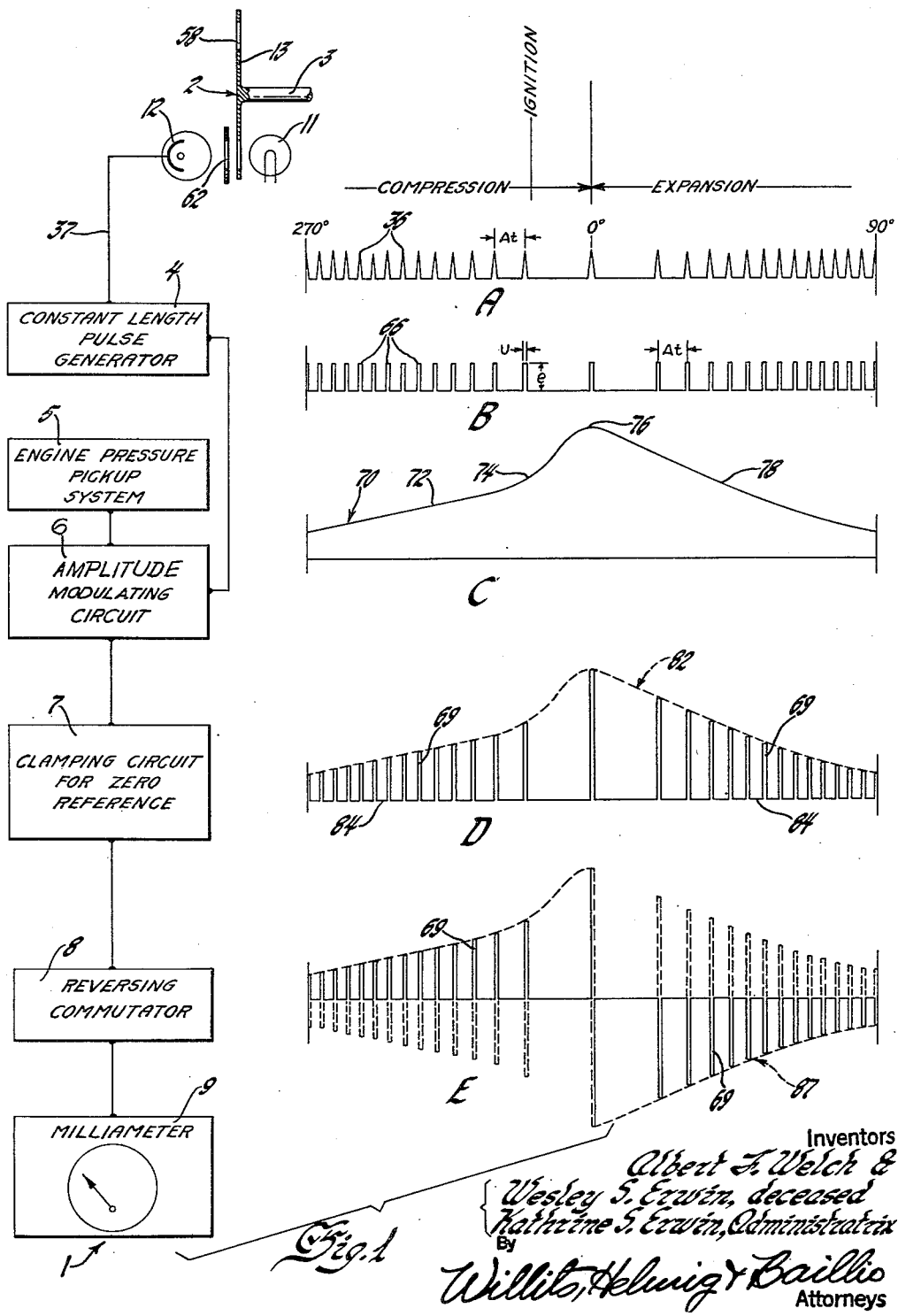
Fig. 1 is a schematic view of a gauge embodying the present invention, and a diagrammatic representation of the wave forms present therein.

Referring to the drawings in more detail, an indicated horsepower gauge 1 embracing the present invention embodies a switch unit 2 which is driven by the engine crankshaft 3. The switch unit 2 triggers a constant length pulse generator 4. A pressure responsive gauge 5 disposed inside of the engine cylinder feeds a signal proportional to the cylinder pressure into an amplitude modulating circuit 6 where it is combined with the output of the pulse generator 4. The combined signal from the multiplying circuit 6 is then consecutively fed through a clamping circuit 7 to insure a zero reference and a reversing commutator 8. The output of the commutator 8 is fed into a meter 9 which may be calibrated to read directly the indicated horsepower. Inasmuch as the various component parts of the gage 1 just referred to are well known in the art, they are simply indicated by labeled blocks in the accompanying drawings.

The switch unit 2 employed for triggering the pulse generator 4 may comprise any suitable rotating member having a series of circumferentially spaced portions thereon which will actuate the pulse generator 4. However, due to the relatively high speeds involved, a switch unit 2 having the minimum amount of inertia is desirable. Accordingly, a photo-electric switch comprising essentially a stationary framework 10, a source of illumination 11, light responsive means 12, and a shutter wheel 13 is preferable. The shutter wheel 13 is mounted to rotate with the engine drive shaft 3 and thereby intermittently interrupt the flow of light from the source of illumination to the light responsive means.

The frame 10 is rigidly secured to a stationary portion of the engine by any suitable means. The frame 10 has a plurality of radial arms 16 and an enlarged base portion 15 for mounting the light responsive means 12.

The outer ends of the arms 16 have holes 18 therethrough for receiving threaded bolts 20. The bolts 20 and the spacing sleeves 21 attach the face plate 22 to the frame 10. The face plate 22 has a central opening 24 axially in line with an opening 26 in the frame 10 for rotatably receiving the shutter wheel 13. The source of illumination which may be a standard incandescent lamp 11 is disposed in a substantially cylindrical tube 28 integral with the bottom of the face plate 22. The lamp 11 is held in the tube 28 by a cap 30 which is threadably secured to the exterior of the tube 28. A light concentrating lens system 32 that is held in the enlarged portion 34 of tube 28 by sleeve 35 insures the proper distribution of light on the light responsive means 12 as well as on the associated shutter wheel 13. Although any suitable light responsive means may be employed, a photoelectric cell of the so called photo-emissive type is preferable. The triggering pulses 36 generated by the light beam striking the photo tube 12 are carried to the pulse or square wave generator 4 by a wire 37.

The shutter wheel 13 has a flange 38 that extends radially outwardly from a substantially cylindrical hub portion 40. Hub 40 has a reduced end 42 that is rotatably supported by a ball bearing 44 provided in the opening 26 of frame 10. The enlarged portion 46 of hub 40 is mounted in a second ball bearing 48 provided in the opening 24 in face plate 22. One end of engine shaft 3 extends into an annular recess provided centrally of the enlarged portion 46 of hub 40 and is secured to wheel 13 by friction means 49. Friction means 49 comprises a reduced annular extension 50 of hub portion 46. Extension 50 is externally threaded 51 and provided with a series of slots 54 extending longitudinally inwardly from the outer end thereof. Consequently when the tapered nut 52 is tightened onto extension 50 the latter is urged tightly into engagement with shaft 3. Shaft 3 and shutter wheel 13 are thus frictionally connected for simultaneous rotation.

The outer periphery of flange 38 on wheel 13 has a rim comprised of alternate transparent windows 58 and opaque areas 60. The transparent areas are elongated windows so disposed that each time the piston of the engine moves a predetermined distance one of the openings will pass the aperture 62 and thereby permit the beam of light to strike the photo-cell. This causes the photo-cell 12 to generate a series of electrical impulses 36 (Fig. 1A) which represent uniform increments in piston displacement. As the piston approaches top or bottom dead center position with the resultant decrease in velocity, the openings 58 are spaced farther apart. This, in turn, will cause the resultant voltage impulses 36 to become less frequent. Accordingly, when the piston is approximately in the center of the cylinder it will have its maximum velocity which results in the openings 58 and impulses 36 being spaced approximately as shown at 90 degrees and 270 degrees in Fig. 1A. It will be noted that for each impulse 36 the piston travels and, therefore, the changes in cylinder displacement are uniform, or expressed mathematically: $dv=C$, wherein $dv$ indicates an increment of volume and $C$ a constant.

Thus, when the flashes of light, resulting from the alignment of the aperture 62 and windows 58 strike the photo-electric cell 12, a series of voltage impulses 36 will be generated. These impulses are illustrated graphically in Fig. 1A and as described above they will be coordinated with the piston motion by means of the shutter mechanism. The output of photo-electric cell 12 is fed directly into the pulse generator 4 and operates to trigger the latter. The pulse generator 4 may be of any standard design such as the rectangular pulse generator shown on page 360 of "Theory and Application of Electron Tubes," second edition, 1944, by Herbert J. Reich and published by McGraw-Hill Book Company. The generator is adjusted to produce a series of substantially square waves 66 similar to those shown in Fig. 1B. To insure maximum accuracy, it is desirable that all of the waves be of substantially uniform magnitude and of constant time duration that is $e=c$ and $u=c'$ where $e$ is the magnitude of the wave, $u$ is the time duration and $c$ and $c'$ are constants. Since the waves 66 are triggered by the output of the photo-electric tube 12, they will also be spaced to represent uniform increments of piston travel. Therefore, the average value of this "wave form" is represented by $$\sum_{0}^{720°} \frac{eu}{\Delta t}$$

where $t$ represents the time interval between the particular consecutive pulses being considered, or restated $$\frac{eu \text{ (number of pulses per cycle)}}{\text{time required for cycle}}$$

However, since the magnitude $e$ and the width $u$ are constant, the average value of this voltage will be a function of $$\frac{1}{\Delta t}$$

The pressure within the engine cylinder may be measured by any suitable pressure responsive system 5 which produces an electrical effect proportional to the cylinder pressure. By interconnecting the pulse generator 4 with the pressure pickup the timing pulses 66 representing the piston movement will be modified to produce a pulse code modulated signal which represents the product of the cylinder pressure times the rate of change of the cylinder volume. In the preferred form of the invention the modulated signal will be a series of pulses having a fixed duration and an amplitude proportional to the pressure. This will produce a wave form similar to that shown at 69 in Fig. 1D. It should be noted that the timing and width of pulses 69 are substantially identical to pulses 66. There are numerous means by which an electrical effect may be obtained and since the particular means employed forms no part of the present invention, any suitable gauge may be employed. For instance, the engine pressure pickup system 5 may include a strain or so called "Li" pressure gauge, wherein the resistance of the unit varies linearly with the pressure, has been found to be particularly well adapted to this purpose. This type of gauge is preferably in the form of a bridge circuit 105 in which one or more of the legs 106 is disposed in the cylinder and the resistance thereof varies directly with the pressure. Thus in the event a uniform voltage were to be applied across a pair of oppositely disposed corners of the bridge the resultant voltage output across the other pair of oppositely disposed corners would be proportional to the pressure in the cylinder and if installed in a cylinder of a typical four cycle gasoline engine, the output will be a signal substantially similar to that shown at 70 in Fig. 1C wherein the line 72 represents compression, the arc 74 the approximate point of ignition, the point 76 top dead center and the line 78 the expansion of the exploded gases. However, it should be noted that in actual practice a constant voltage is not applied to the pressure gauge. Instead the pulses from the pulse generator 4 are applied to a pair of oppositely disposed corners 107 and 108 of the bridge 105, the output of the remaining two corners 109 and 110 of the bridge circuit 105 will be a modulated signal 69 as indicated in Fig. 1D. This signal 69 will be a series of pulses similar to the pulses in Figure 1B except that the amplitudes of the pulses will vary in accordance with the variations in the cylinder pressures. Thus it will be seen that the envelope 82 of this wave will be proportional to the engine pressure or similar to Fig. 1C while the wave 69 will represent the product of $$P \cdot \frac{eu}{t}$$

where P designates the cylinder pressure.

It is also possible to use a capacity type pressure gauge similar to that shown in the patent to A. F. Welch No. 2,571,507. If such a pressure gauge is utilized, when properly energized by a constant voltage, the output will be a signal similar to Figure 1C. Such an output is multiplied by the timing impulses by any suitable means such as the mixing circuit shown on page 185 in "Theory and Application of Electron Tubes" by Reich.

To obtain maximum accuracy, it has been found advantageous to prevent drifting of the signal 69 of Fig. 1D by any conventional clamping circuit 7. This will insure the current returning to zero as at 84 when there is no light striking the photo-sensitive tube 12.

During the compression of the gas in the cylinder, work is done by the piston and when the gas is expanding, work is done on the piston. Therefore, to distinguish between these two phases of the operation, it is necessary to have a suitable commutator indicated generally at 8 to reverse polarity of the current in order to distinguish from the work done by and done on the piston. This will cause portions 87 of the wave to be inverted as is shown in Fig. 1E.

After the current has been commutated it is fed into a meter 9 of suitable capacity. Meter 9 is of the "averaging" or direct current type. This meter may be calibrated to indicate the amount of current flowing or it may be calibrated to indicate directly the amount of power developed within the engine.

Fig. 4 refers to a modification of the present invention. In this modification the switch means and the pressure responsive element may be the same as in the preferred form. The output of the switch means and the pressure responsive device are modulated to produce a code modulated signal representing the product of the two signals. However, in this embodiment the modulated pulses are of uniform amplitude and the width of the pulse is varied in proportion to the amplitude of the pressure voltage 70 by a duration modulating circuit in place of the amplitude modulating circuit 6 of Figure 1. Instead of maintaining the width of pulses 69 constant and varying the amplitude, the magnitude is kept constant and the width is varied. A circuit suitable for this operation is described in "An Experimental Multichannel Pulse Code Modulation System of Toll Quality" by L. A. Meacham and E. Peterson on page 1 of the "Bell System Technical Journal" for January 1948. This will produce a series of pulses 92, having an area corresponding to the product of the cylinder pressure and piston displacement which is the exact equivalent of the pulses in the preferred embodiment. Since the signals 92 from the duration modulating circuit of the preferred form are the equivalent of the modulating circuit 6 in the modification, they are treated the same. That is they are fed through a similar clamping circuit 7 and reversing commutator 8 and into a meter 9 that will register the indicated horsepower.

From the foregoing it is apparent that an accurate and reliable horsepower indicator has been devised which will enable a more exact analysis of internal combustion engines. It will be apparent to those skilled in the art that numerous modifications may be made without departing from the spirit of the invention. It is to be understood that the foregoing description is to be considered as being illustrative of the invention only and in no way restrictive, and that the invention is to be limited only by the scope of the claims which follow.

What is claimed is:

1. In a gauge for measuring the power developed by a fluid expanding in an engine having at least one cylinder, a piston reciprocating in said cylinder, and a crankshaft driven by said piston, the combination of a stationary member having an aperture therethrough, a source of illumination disposed on one side of said member, light responsive means disposed on the opposite side of said member, said light responsive means being positioned in substantial alignment with said aperture and said source of illumination, a shutter wheel driven by said chankshaft and having a series of transparent windows therethrough, said shutter wheel being so positioned that one of said windows will individually register with said aperture whenever said piston travels a predetermined amount whereby said light responsive means will produce a series of triggering pulses for equal increments of piston travel, said pulses having an instantaneous frequency proportional to the rate of change in the volume of said cylinder, a pressure responsive device communicating with the interior of said cylinder to produce an electrical effect proportional to the pressure on said piston, a pulse generator connected to said light responsive means and triggered by said triggering pulses to produce a signal having a series of pulses representing uniform increments of piston travel, a pulse modulating circuit connected to said pulse generator and said pressure responsive device and having an electrical output that comprises said pulse modulated by said electrical effect, a reversing commutator driven by said crankshaft and connected to said modulating circuit and actuated whenever said piston reverses its direction of travel to reverse said output when said fluid is to be expanded and compressed, and a meter coupled to said commutator for indicating the integral of the output of said commutator.

2. A gauge for measuring the power developed by a fluid working on a piston which is movably disposed within a cylinder for rotatably driving a crankshaft, said gauge comprising a pulse generating means operatively connected to said crankshaft to be actuated by movement thereof whenever said piston travels a predetermined distance, said pulse generating means having an output comprising a series of pulses of substantially uniform amplitude and uniform time duration, each of said pulses representing equal increments of piston travel and having an instantaneous frequency proportional to the rate of change in the volume in said cylinder, means connected to said pulse generator and adapted to communicate with the interior of said cylinder to produce an electrical effect for modulating said pulses in proportion to the pressure of said fluid in said cylinder, a reversing commutator adapted to be driven by said crankshaft and being connected to said means and actuated whenever said piston reverses its direction of travel and an indicating meter connected to said commutator.

3. In a gauge for measuring the power developed by a fluid expanding in an engine having at least one cylinder, a piston reciprocating in said cylinder and a crankshaft driven by said piston, the combination of a stationary member having an aperture therethrough, a source of illumination disposed on one side of said member, a light responsive device disposed on the opposite side of said member, said light responsive device being positioned in substantial alignment with said aperture and said source of illumination, a shutter wheel driven by said crankshaft and having a series of transparent windows therethrough, said shutter wheel being so positioned that one of said windows will individually register with said aperture whenever said piston travels a predetermined amount whereby said light responsive device will produce a series of triggering pulses for equal increments of piston travel, said pulses having an instantaneous frequency proportional to the rate of change in the volume of said cylinder, a pulse generator connected to said light responsive device and triggered by said triggering pulses to produce a signal having a series of pulses representing uniform increments of piston travel, pressure responsive means communicating with said cylinder and producing an electrical effect variable with pressure, said last mentioned means being connected to said pulse generator to modulate said pulses in proportion to the pressure in said cylinder, a reversing commutator driven by said crankshaft and connected to said means and actuated whenever said piston reverses its direction of travel to reverse said modulated signal when said fluid is expanded and compressed and a meter connected to said means for indicating the integral of the output of said commutator.

4. A gauge for measuring the power developed by a fluid working on a piston movably disposed within a cylinder for rotatably driving a crankshaft, said gauge comprising a pressure responsive device adapted to have a portion thereof communicating with the interior of said cylinder for sensing the pressure of said fluid in said cylinder to produce an electrical effect varying with and proportional to said pressure, switch means adapted to be connected to said crankshaft to be actuated by movement thereof whenever said piston travels a predetermined distance, a pulse generator connected to said switch means and triggered thereby said pulse generator having an electrical output comprising a series of electrical pulses of substantially uniform amplitude and uniform time duration whose instantaneous frequency is proportional to the rate of change of volume of said fluid, a modulating circuit connected to said pressure responsive device and said pulse generator, said modulating circuit having an electrical output comprising a series of electrical pulses of substantially uniform time duration and amplitude modulated in proportion to said electrical effect, a reversing commutator adapted to be driven by said crankshaft and actuated whenever said piston reverses its direction of travel, said commutator being connected to said modulating circuit and an indicating meter operatively coupled to said commutator.

5. A gauge for measuring the power developed by a fluid working on a piston which is movably disposed within a cylinder for rotatably driving a crankshaft, said gauge comprising a pressure responsive device having a portion thereof adapted to communicate with the interior of said cylinder for sensing the pressure of said fluid and producing an electrical effect which varies with and in proportion to the pressure of said fluid, switch means adapted to be actuated by movement of said crankshaft whenever said piston travels a predetermined distance, a pulse generator triggered by said switch means, said pulse generator having an electrical output comprising a series of electrical pulses of substantially uniform amplitude and uniform time duration whose instantaneous frequency is proportional to the rate of volume change, a modulating circuit connected to said pressure responsive device and said pulse generator, said modulating circuit having an electrical output comprising a series of electrical pulses of substantially uniform amplitude and having a time duration modulated in proportion to said electrical effect, a reversing commutator adapted to be driven by said piston and being connected to said modulating circuit and actuated whenever said piston reverses its direction of travel and an indicating meter connected to said commutator.

6. The combination of claim 2 wherein said last mentioned means are effective for modulating the amplitudes of said pulses in proportion to said pressure.

7. The combination of claim 2 wherein said last mentioned means are effective to modulate the time durations of said pulses in proportion to said pressure.

References Cited in the file of this patent

UNITED STATES PATENTS

| | | |
|---|---|---|
| 1,159,769 | Hollstein | Nov. 9, 1915 |
| 2,067,262 | Demontvignier | Jan. 12, 1937 |
| 2,349,560 | Reijnst | May 23, 1944 |
| 2,725,191 | Ham | Nov. 29, 1955 |

FOREIGN PATENTS

| | | |
|---|---|---|
| 353,172 | Germany | May 11, 1922 |

OTHER REFERENCES

Publications:

(1) "Photo Electric Cell Used With Mirror Diaphragm in New Labarthe Indicator" by Heldt, published on pages 160–163. Automotive Industries Feb. 10, 1934.

(2) "3 New Photo Electric Instruments for High Speed Engine Research" by Kalman J. DeJuhasz on pages 36–49 of "Automotive Industries," July 1947.